(12) United States Patent
Lee et al.

(10) Patent No.: US 12,381,298 B2
(45) Date of Patent: Aug. 5, 2025

(54) SUPERCONDUCTING QUBIT MEMORY OF QUANTUM COMPUTER

(71) Applicant: SAMSUNG ELECTRONICS CO., LTD., Suwon-si (KR)

(72) Inventors: Jaehyeong Lee, Gwacheon-si (KR); Hyeokshin Kwon, Seoul (KR); Jaeho Shin, Cheonan-si (KR); Taehwan Jang, Suwon-si (KR); Insu Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/770,206

(22) Filed: Jul. 11, 2024

(65) Prior Publication Data

US 2024/0363989 A1    Oct. 31, 2024

Related U.S. Application Data

(63) Continuation of application No. 17/515,055, filed on Oct. 29, 2021, now Pat. No. 12,062,826.

(30) Foreign Application Priority Data

Nov. 11, 2020  (KR) .................. 10-2020-0150514

(51) Int. Cl.
  *H01P 3/00*      (2006.01)
  *G06N 10/00*     (2022.01)
  *H01P 7/08*      (2006.01)

(52) U.S. Cl.
  CPC ............. *H01P 3/003* (2013.01); *G06N 10/00* (2019.01); *H01P 7/086* (2013.01)

(58) Field of Classification Search
  CPC . H01P 3/003; H01P 7/086; H01P 7/08; G06N 10/00; G06N 10/40; H01L 29/7613;
  (Continued)

(56) References Cited

U.S. PATENT DOCUMENTS 4,554,567 A    11/1985  Jillie et al.
8,654,578 B2    2/2014  Lewis et al.
(Continued)

FOREIGN PATENT DOCUMENTS

CN        111401561 A      7/2020
KR    10-2021-0128787 A    10/2021

OTHER PUBLICATIONS

Naik et al., "Random access quantum information processors using multimode circuit quantum electrodynamics," Nature Communications, vol. 8, No. 1904, 2017, total 7 pages.
(Continued)

*Primary Examiner* — John W Poos
(74) *Attorney, Agent, or Firm* — Sughrue Mion, PLLC

(57) ABSTRACT

A qubit memory of a quantum computer is provided. The qubit memory according to an embodiment includes a first readout unit, a first transmon, and a first data storage unit storing quantum information, and the first data storage unit includes a first superconducting waveguide layer, an insulating layer, and a superconductor layer sequentially stacked on a substrate. In one example, the first superconducting waveguide layer may include a superconducting resonator.

10 Claims, 6 Drawing Sheets

(58) Field of Classification Search
CPC ... H01L 29/66977; G11C 11/44; B82Y 10/00; H10N 60/12
See application file for complete search history.

(56) References Cited

U.S. PATENT DOCUMENTS

| | | | |
|---|---|---|---|
| 9,385,293 B1* | 7/2016 | Nayfeh | H10N 60/12 |
| 10,763,347 B2* | 9/2020 | Amin | H10D 30/43 |
| 2019/0044047 A1* | 2/2019 | Elsherbini | H10N 60/815 |
| 2019/0273197 A1* | 9/2019 | Roberts | G06N 10/40 |
| 2021/0057631 A1* | 2/2021 | Swenson | H10N 60/12 |
| 2021/0328127 A1 | 10/2021 | Kwon et al. | |

OTHER PUBLICATIONS

Xie et al., "Compact 3D quantum memory," Applied Physics Letters, vol. 112, 202601, May 18, 2018, total 6 pages.

* cited by examiner

SUPERCONDUCTING QUBIT MEMORY OF QUANTUM COMPUTER

CROSS-REFERENCE TO RELATED APPLICATION

This present application is a continuation of U.S. application Ser. No. 17/515,055, filed Oct. 29, 2021, which claims priority under 35 U.S.C. § 119 to Korean Patent Application No. 10-2020-0150514, filed on Nov. 11, 2020, in the Korean Intellectual Property Office, the disclosures of which are incorporated by reference herein in their entirety.

BACKGROUND

1. Field

Example embodiments consistent with the disclosure relate to computers, and more particularly, to superconducting qubit memories of quantum computers.

2. Description of Related Art

One of the configurations of a superconducting qubit memory of a quantum computer is a 2D quantum memory in which a transmon, which is a computation part including a transmission line and a Josephson junction, and superconducting resonator series are connected to each other on the same layer to form a 2D-chip. The method in this case is a superconducting LC-circuit method, and quantum information is computed in the transmon and then stored in one of the multiple modes of the superconducting resonator series.

SUMMARY

Provided are qubit memories of quantum computers capable of increasing the utilization and degree of integration of a memory space.

Provided are qubit memories of quantum computers capable of enhancing coupling between superconducting resonator layers.

Provided are qubit memories of quantum computers capable of reducing the influence of external noise.

Additional aspects will be set forth in part in the description which follows and, in part, will be apparent from the description, or may be learned by practice of embodiments of the disclosure.

According to some example embodiments, a qubit memory of a quantum computer, the qubit memory includes: a first readout unit; a first transmon; and a first data storage unit configured to store quantum information, wherein the first data storage unit includes a first superconducting waveguide layer, an insulating layer, and a superconductor layer sequentially stacked on a substrate. In one example, the first superconducting waveguide layer may include a superconducting resonator. In one example, the first superconducting waveguide layer may have a thickness in a range from about 50 nm to about 100 nm. In one example, the superconducting layer may have a thickness in a range from about 50 nm to about 100 nm. In one example, the insulating layer may continuously extend onto the superconductor layer, and may cover an entire upper surface of the superconductor layer. In one example, the sequentially stacked first superconducting waveguide layer, the insulating layer, and the superconductor layer may constitute a first stack structure. In one example, each of the plurality of stacks may include the first superconducting waveguide layer, the insulating layer, and the superconductor layer. In one example, a buried shape of the superconductor layer in the insulating layer of some of the stack structures from among the plurality of stack structures may be the same as a buried shape of the superconductor layer in the insulating layer of the first stack structure, and a buried shape of the superconductor layer in the insulating layer of the remaining stack structures may be different from the buried shape of the superconductor layer in the insulating layer. In one example, the qubit memory may further include: a second readout unit; a second transmon; and a second data storage unit configured to store quantum information, wherein the second data storage unit may include a stack structure that is the same as the first stack structure and the plurality of stack structures.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
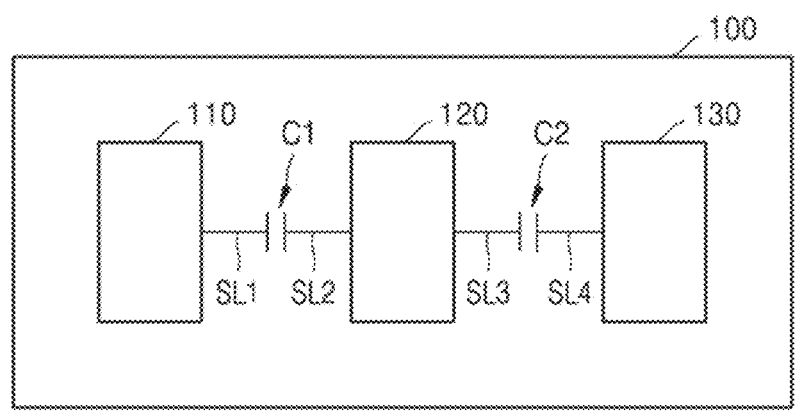
FIG. 1 is a plan view showing a configuration of a unit qubit memory of a quantum computer according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a qubit memory of a quantum computer according to an embodiment will be described in detail with reference to the accompanying drawings. In the drawings, thicknesses of layers and regions may be exaggerated for clarity of the specification. Embodiments are capable of various modifications and may be embodied in many different forms. Also, in the layer structures described below, when an element or layer is referred to as being "on" or "above" another element or layer, the element or layer may be directly on another element or layer or intervening elements or layers. In the drawings described below, like reference numerals refer to like elements throughout.

FIG. 1 is a schematic plan view of a configuration of a unit qubit memory 100 of a quantum computer according to an example embodiment.

Referring to FIG. 1, the unit qubit memory 100 includes a readout unit 110, a transmon 120 in charge of an operation, and a data storage unit 130. Information may be read or input through the readout unit 110. The readout unit 110 may include a plurality of superconducting coplanar waveguides. In one example, each of the superconducting coplanar waveguides may include a superconducting resonator. The data storage unit 130 may store data (quantum information) calculated by the transmon 120.

Figure 2:
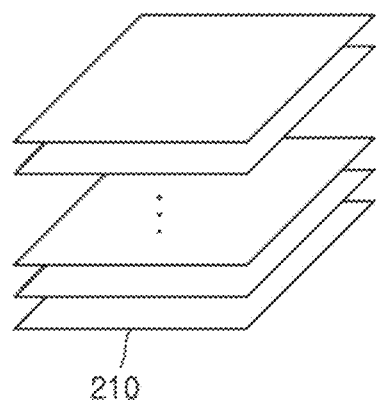
FIG. 2 is a three-dimensional view of an example of a configuration of a data storage unit of the qubit memory of FIG. 1.

At least one first capacitor C1 may be provided between the readout unit 110 and the transmon 120. The readout unit 110 and the transmon 120 may be connected to each other through the first capacitor C1. The first capacitor C1 may include a first superconducting line SL1 connected to the readout unit 110 and a second superconducting line SL2 connected to the transmon 120. Accordingly, the first capacitor C1 may be referred to as a first superconducting capacitor. The first and second superconducting lines SL1 and SL2 are separated from each other. A second capacitor C2 may be provided between the transmon 120 and the data storage unit 130. The transmon 120 and the data storage unit 130 may be connected to each other through the second capacitor C2. The second capacitor C2 may include a third superconducting line SL3 connected to the transmon 120 and a fourth superconducting line SL4 connected to the data storage unit 130. Accordingly, the second capacitor C2 may also be referred to as a second superconducting capacitor. The third superconducting line SL3 and the fourth superconducting line SL4 are separated from each other. The data storage unit 130 may be a superconducting data storage unit including a plurality of superconducting layers. For example, the data storage unit 130 may include a plurality of coplanar waveguide layers 210 vertically stacked as shown in FIG. 2. Here, "vertically" may denote a direction perpendicular to an upper surface of a substrate on which the plurality of coplanar waveguide layers 210 are stacked.

In the case of a quantum computer of the related art, a plurality of coplanar waveguide layers are horizontally arranged on the same plane of the same layer. Accordingly, an area occupied by the plurality of coplanar waveguide layers is relatively wide, and thus, the space utilization is reduced and the degree of integration is also reduced.

On the other hand, in the case of a qubit memory of a quantum computer according to an example embodiment, the plurality of coplanar waveguide layers 210 are vertically stacked, and an area occupied by the plurality of coplanar waveguide layers 210 in the data storage unit 130 is much less than an area in the related art. Accordingly, compared to the related art, the space utilization of the data storage unit 130 may be increased, and the degree of integration may also be increased.

The plurality of coplanar waveguide layers 210 may vertically contact each other through an insulating layer, which will be described below. Each of the plurality of coplanar waveguide layers 210 may be a superconducting resonator or may include a superconducting resonator. Accordingly, the coplanar waveguide layers 210 may be referred to as superconducting coplanar waveguide layers.

Figure 3:
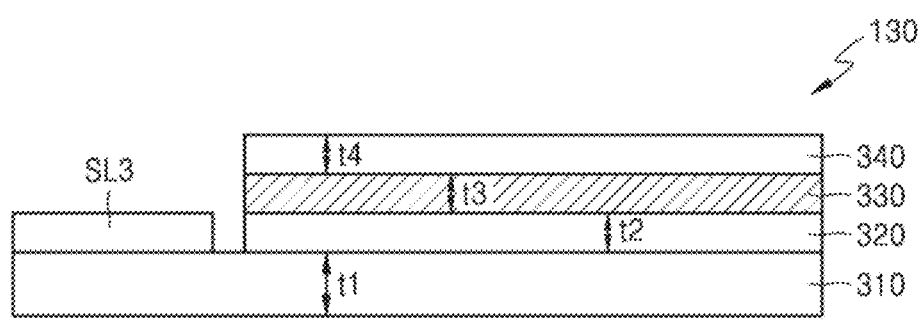
FIG. 3 is a side view of an example of a coplanar waveguide layer included in the data storage unit of the qubit memory of FIG. 1.

FIG. 3 is a side view of the data storage unit 130 including the coplanar waveguide layer 210 according to an example embodiment.

Referring to FIG. 3, the data storage unit 130 includes a first resonator layer 320, an insulating layer 330, and an upper layer 340 sequentially stacked on a substrate 310. The insulating layer 330 may directly contact the first resonator layer 320, and the upper layer 340 may directly contact the insulating layer 330. For example, the substrate 310 may have a thickness t1 in a range from about 400 μm to about 700 μm, from about 450 μm to about 650 μm, from about 460 μm to about 500 μm, from about 600 μm to about 650 μm, about 470 μm, or about 640 μm. For example, the substrate 310 may include a sapphire substrate or a silicon substrate. For example, the silicon substrate may include an undoped silicon substrate. The first resonator layer 320 and the upper layer 340 may be the same or different superconductor layers or respectively may include a superconductor layer. For example, the upper layer 340 may have a thickness t4 in a range from about 50 nm to about 100 nm. For example, the upper layer 340 may be an electromagnetic wave shielding layer. Accordingly, since the upper layer 340 is provided, external noises (e.g., external electromagnetic waves) that interfere with the operation of the qubit memory may be blocked, and also, a quality factor (Q-factor) of the first resonator layer 320 may also be improved. For example, a material of the upper layer 340 may include one selected from aluminum (Al), niobium (Nb), niobium nitride, niobium titanium nitride, tantalum (Ta), lead (Pb), and permalloy, but is not limited thereto. For example, the first resonator layer 320 may have a thickness t2 in a range from about 50 nm to about 100 nm. For example, a material of the first resonator layer 320 may be one selected from aluminum (Al), niobium (Nb), niobium nitride, niobium titanium nitride, and tantalum (Ta), but is not limited thereto. In an example, the insulating layer 330 may have a thickness t3 in a range from about 200 nm to about 600 nm, and the thickness t3 of the insulating layer 330 may vary according to the material of the insulating layer 330 within the above range. For example, when the insulating layer 330 is a silicon oxide layer (e.g., a $SiO_2$ layer), the thickness t3 of the insulating layer 330 may be about 500 nm. When the insulating layer 330 is an aluminum oxide layer (e.g., AlOx layer), the thickness t3 of the insulating layer 330 may be about 250 nm. The first resonator layer 320 may include a portion coupled to the transmon 120, and this portion may constitute the second capacitor C2 together with the third superconducting line SL3 formed on the substrate 310. The third superconducting line SL3 is separated from the first resonator layer 320.

Figure 4:
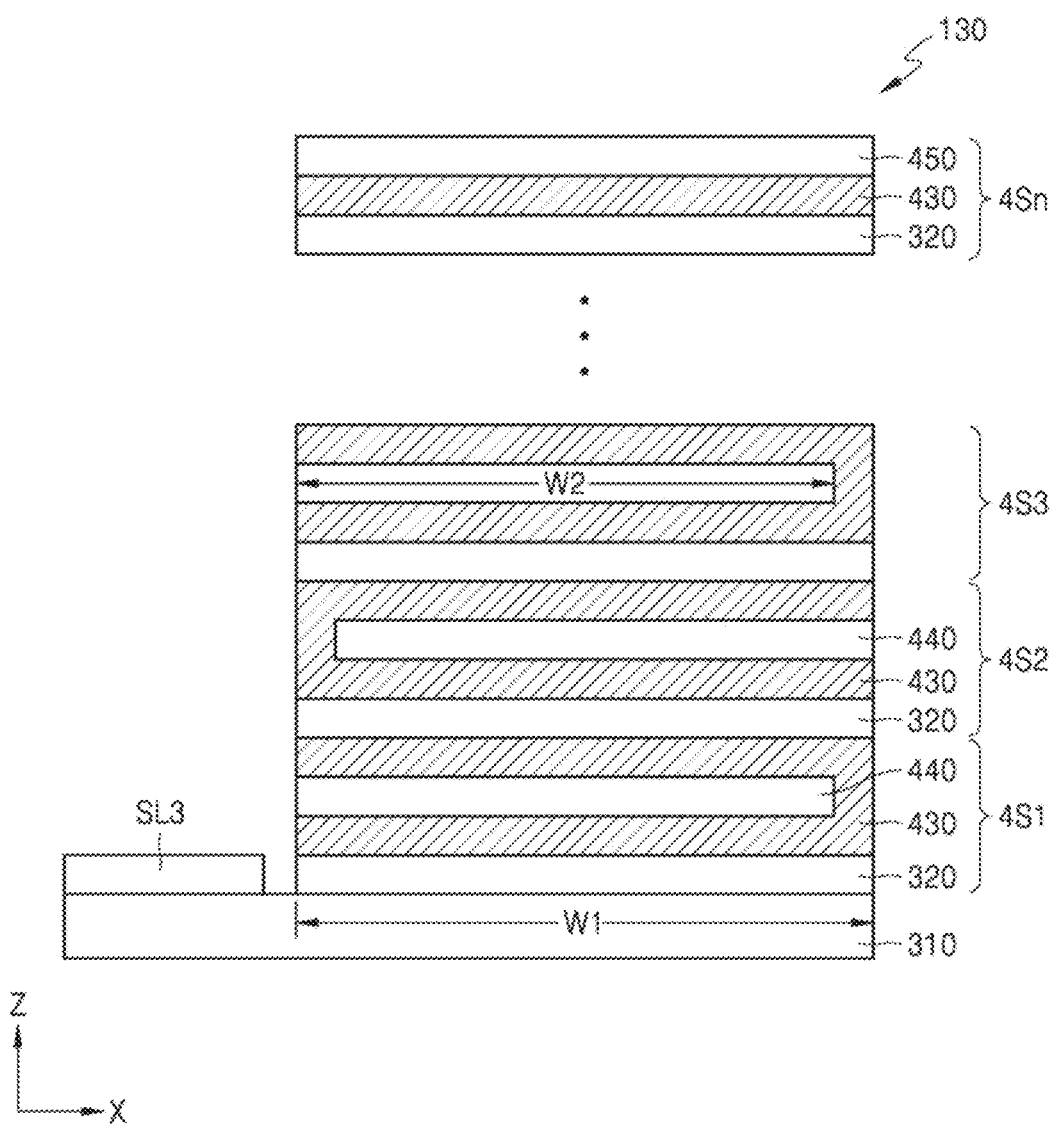
FIG. 4 is a side view of a data storage unit including a plurality of coplanar waveguide layers of FIG. 2.

FIG. 4 is a side view of the data storage unit 130 including the plurality of coplanar waveguide layers 210 of FIG. 2.

Referring to FIG. 4, the data storage unit 130 includes the first resonator layer 320, a first insulating layer 430, and a first superconductor layer 440 sequentially stacked on the substrate 310. The first resonator layer 320 and the third superconducting line SL3 are separated from each other. The first resonator layer 320 and the first superconductor layer 440 may be parallel to each other. The first superconductor layer 440 in the X-axis direction as shown in FIG. 4 has a width W2 less than a width W1 of the first resonator layer 320 in the X-axis direction. The left side of the first resonator layer 320, the left side of the first insulating layer 430, and the left side of the first superconductor layer 440 may all be in the same first plane. The right side of the first resonator layer 320 and the right side of the first insulating layer 430 may be in the same second plane. The positions of the first and second planes are different from each other. The first insulating layer 430 may extend onto the first superconductor layer 440 (e.g., onto a top surface of the first superconductor layer 440). The first insulating layer 430 covers an entire upper surface of the first resonator layer 320. The first insulating layer 430 covers entire upper, right, and bottom surfaces of the first superconductor layer 440. As a result, the first superconductor layer 440 is formed in a shape buried in the first insulating layer 430 from left to right, and only the left side of the first superconductor layer 440 is exposed. A first stack structure 4S1 including the sequentially stacked first resonator layer 320, the first insulating layer 430, and the first superconductor layer 440 may be a unit stack structure. The unit stack structure may correspond to one coplanar waveguide layer 210 of FIG. 2. Second to n-th stack structure 4S2 . . . 4Sn (n>2) may further be sequentially stacked on the first stack structure 4S1. In the case of the n-th stack structure 4Sn, the top layer may be an upper superconductor layer 450, and only the first insulating layer 430 may be provided between the first resonator layer 320 and the upper superconductor layer 450. A material of the upper superconductor layer 450 may be the same as or different from the material of the first superconductor layer 440. Among the first to n-th stack structures 4S1 . . . 4Sn, the layer configuration and material of the odd-numbered stack structures 4S1, 4S3 . . . may be identical to each other, and the layer configuration and material of the even-numbered stack structures 4S2, 4S4 . . . may be identical to each other. In the layer configuration of the odd-numbered stack structures 4S1, 4S3 . . . , the first superconductor layer 440 is in a shape (e.g., a first buried shape) buried in the first insulating layer 430 from left to right. On the other hand, in the layer configuration of the even-numbered structures 4S2, 4S4 . . . , the first superconductor layer 440 may be in a shape (e.g., a second buried shape) buried in the first insulating layer 430 from right to left. Accordingly, in the case of the odd-numbered stacks 4S1, 4S3 . . . , the left side of the first superconductor layer 440 is exposed, while in the even-numbered stack structures 4S2, 4S4 . . . the right side of the first superconductor layer 440 is exposed.

As described above, since the first to n-th stack structures 4S1 . . . 4Sn are formed to be vertically stacked, a distance between the first resonator layers 320 of each stack may be about several tens of nm. Accordingly, the coupling between the superconducting resonator layers may be strengthened compared to the case of the related art in which the plurality of resonator layers are horizontally arranged on the same plane. As a result, interaction between memory modes may also be enhanced.

For example, the thickness and material of the first insulating layer 430 may be the same as or different from the thickness and material of the insulating layer 330 of FIG. 3. Also, the thickness and material of the first superconductor layer 440 may be the same as or different from the thickness and material of the upper layer 340 of FIG. 3.

Figure 5:
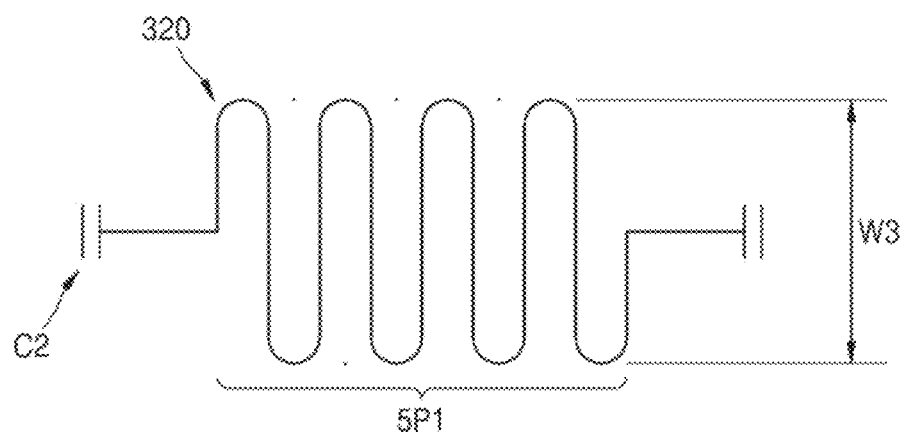
FIG. 5 is a plan view showing an example of a coplanar waveguide layer included in a unit qubit memory of a quantum computer, according to an embodiment.

FIG. 5 shows a plan view of the first resonator layer 320 of FIGS. 3 and/or 4.

Referring to FIG. 5, the first resonator layer 320 includes a portion 5P1 formed in a zigzag shape traveling from one side to another in alternating directions. A width W3 of the portion 5P1 formed in a zigzag shape may be constant.

As described with reference to FIG. 4, the plurality of stack structures 4S1 . . . 4Sn included in the data storage unit 130 are formed to be stacked in a direction perpendicular to an upper surface of the substrate 310, that is, in a Z-axis direction, and as a result, an area occupied by the plurality of resonator layers 320 on the substrate 310 may be much less than an area of the related art. Accordingly, the degree of integration may be increased by arranging two or more of the unit qubit memory 100 of FIG. 1 on the same area as a single unit qubit memory of the related art on the substrate 310, and FIG. 6 shows an example of this case.

Figure 6:
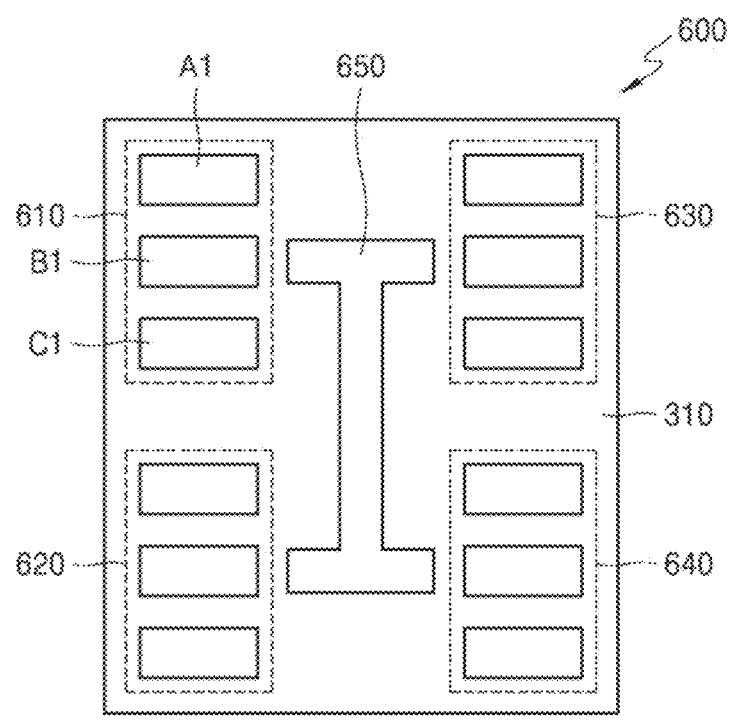
FIG. 6 is a plan view illustrating a qubit memory including a plurality of unit qubit memories, according to an embodiment.

Referring to FIG. 6, a qubit memory 600 includes first to fourth qubit memories 610, 620, 630 and 640 on the substrate 310. The number of qubit memories that may be formed on the substrate 310 is not limited to four. The first to fourth qubit memories 610, 620, 630, and 640 are separated from each other and are regularly arranged vertically and horizontally. A bus-superconducting layer 650 is provided between the first and second qubit memories 610 and 620 and the third and fourth qubit memories 630 and 640. One end of the bus-superconductor layer 650 is adjacent to a transmon B1 of the first and third qubit memories 610 and 630, and the other end is adjacent to a transmon B1 of the second and fourth qubit memories 620 and 640. The one end and the other end of the bus-superconductor layer 650 are separated from the transmons B1 of each of the qubit memories 610, 620, 630, and 640. For example, the bus-superconductor layer 650 may be a superconducting bus-resonator layer or may include a superconducting bus-resonator layer. Each of the first to fourth qubit memories 610, 620, 630, and 640 may have the same configuration as the unit qubit memory 100 of FIG. 1. That is, a readout unit A1, the transmon B1, and a data storage unit C1 of each of the qubit memories 610, 620, 630, and 640 may correspond to the readout unit 110, the transmon 120, and the data storage unit 130 of the unit qubit memory 100 of FIG. 1.

In the data storage unit of the qubit memory of the quantum computer described above, a plurality of coplanar waveguide layers (superconducting resonator layers) are not horizontally arranged on the same horizontal plane, but vertically stacked. Accordingly, since more unit qubit memories may be formed in the same area, the utilization of the memory space and the degree of integration of the memory may be increased. Accordingly, a multi-qubit memory may be readily implemented. Also, as a plurality of coplanar waveguide layers are vertically stacked in a data storage unit, a distance between the superconducting resonator layers is reduced close to a nanometer level (e.g., several tens of nm), and thus, the coupling between the superconducting resonator layers may be strengthened. Accordingly, the interaction between the memory modes may also be enhanced. Also, in a data storage unit, superconductor layers are formed on a superconducting resonator layer with an insulating layer therebetween. A superconductor layer formed in this way may block external noise (e.g., external electromagnetic waves) that interferes with the operation of a qubit memory, and the Q-factor of the superconducting resonator layer itself may be improved due to the superconductor layer.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A qubit memory of a quantum computer, the qubit memory comprising:
   a first qubit memory,
   wherein the first qubit memory comprises a first data storage unit configured to store quantum information,
   wherein the first data storage unit comprises:
   a substrate; and a plurality of superconducting waveguide layers which are separated from each other and vertically stacked on the substrate, and wherein the first data storage unit further comprises an insulating layer and a superconductor layer that are between the plurality of superconducting waveguide layers.

2. The qubit memory of claim 1, wherein each of the plurality of superconducting waveguide layers comprises a superconducting resonator.

3. The qubit memory of claim 1, wherein a first superconducting waveguide layer of the plurality of superconducting waveguide layers has a thickness in a range from about 50 nm to about 100 nm.

4. The qubit memory of claim 1, wherein the superconductor layer has a thickness in a range from about 50 nm to about 100 nm.

5. The qubit memory of claim 1, wherein the insulating layer continuously extends onto the superconductor layer and covers an entire upper surface of the superconductor layer.

6. The qubit memory of claim 1, wherein the first data storage unit comprises a plurality of stack structures, and wherein each of the plurality of stack structures comprises the insulating layer, the superconductor layer and one of the superconducting waveguide layers.

7. The qubit memory of claim 6, wherein some stack structures from among the plurality of stack structures have a first buried shape of the superconductor layer in the insulating layer, wherein the remaining stack structures from among the plurality of stack structures have a second buried shape of the superconductor layer in the insulating layer, and wherein the second buried shape is different from the first buried shape.

8. The qubit memory of claim 1, wherein the first qubit memory further comprises:

a readout unit; and a transmon.

9. The qubit memory of claim 1, further comprising a second qubit memory comprising a second data storage unit.

10. A quantum computer comprising:

a qubit memory comprising:

a first qubit memory, wherein the first qubit memory comprises a first data storage unit configured to store quantum information, wherein the first data storage unit comprises:

a substrate; and a plurality of superconducting waveguide layers which are separated from each other and vertically stacked on the substrate, and wherein the first data storage unit further comprises an insulating layer and a superconductor layer that are between the plurality of superconducting waveguide layers.

* * * * *